(12) United States Patent  
Gamberoni et al.

(10) Patent No.: US 7,001,005 B2  
(45) Date of Patent: Feb. 21, 2006

(54) DOMESTIC REFRIGERATOR WITH IMPROVED THERMAL INSULATION

(75) Inventors: Luca Gamberoni, Ispra (IT); Jutta Ziermaier, Travedona Monate (IT); Roberta Bernasconi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/291,161

(22) Filed: Nov. 8, 2002

(65) Prior Publication Data

US 2003/0090188 A1    May 15, 2003

(30) Foreign Application Priority Data

Nov. 9, 2001    (IT)    ............................ VA2001A0040

(51) Int. Cl.
*A47B 96/04* (2006.01)
*A47J 39/00* (2006.01)
*F25D 11/04* (2006.01)

(52) U.S. Cl. ...................... 312/400; 312/401; 312/406; 220/592.1; 62/440

(58) Field of Classification Search ................ 312/400, 312/401, 406, 406.1; 220/592.1, 592.01, 220/592.02, 592.09; 62/440, 447
See application file for complete search history.

(56) References Cited

U.S. PATENT DOCUMENTS

| | | | | |
|---|---|---|---|---|
| 3,264,165 A | * | 8/1966 | Stickel | 428/69 |
| 3,608,627 A | * | 9/1971 | Shevlin | 165/206 |
| 4,002,199 A | * | 1/1977 | Jacobs | 165/61 |
| 4,172,915 A | * | 10/1979 | Sheptak et al. | 428/69 |
| 4,196,950 A | * | 4/1980 | Churchill et al. | 312/406 |
| 4,282,276 A | * | 8/1981 | Smith | 428/34.3 |
| 4,284,674 A | * | 8/1981 | Sheptak | 428/69 |
| 5,018,328 A | * | 5/1991 | Cur et al. | 52/406.2 |
| 5,044,705 A | * | 9/1991 | Nelson | 312/228 |
| 5,082,335 A | * | 1/1992 | Cur et al. | 312/401 |
| 5,335,988 A | * | 8/1994 | Lynn et al. | 312/406.2 |
| 6,109,712 A | * | 8/2000 | Haworth et al. | 312/400 |
| 6,701,742 B1 | * | 3/2004 | Mack et al. | 62/430 |

* cited by examiner

*Primary Examiner*—Peter M. Cuomo
*Assistant Examiner*—Sarah B. McPartlin
(74) *Attorney, Agent, or Firm*—Robert O. Rice; Stephen Krefman; John F. Colligan

(57) ABSTRACT

A domestic refrigerator or freezer has a food storage compartment delimited by insulated walls and by one or more access doors to the compartment. One or more walls or doors are provided with a metallic film, preferably a metallised polymeric film, capable of enhancing the performance of the refrigerator with regard to energy saving.

7 Claims, 2 Drawing Sheets

DOMESTIC REFRIGERATOR WITH IMPROVED THERMAL INSULATION

BACKGROUND OF THE INVENTION

1. Field of the Invention

The present invention relates to a domestic refrigerator of the type comprising a food storage compartment delimited by insulated walls and by one or more access doors to said compartment.

The term "refrigerator" refers to any household electrical appliance for food storage, the internal temperature of which appliance is maintained below ambient temperature; said definition includes both conventional refrigerators per se and also upright or chest freezers and the various combinations thereof.

2. Description of the Related Art

It is a well known requirement in the domestic refrigeration sector to reduce energy consumption, for example by increasing the thermal insulation of the storage compartment. This may involve using thicker insulating walls, with the unwanted result of reducing the usable volume of the food storage compartment, or using insulating materials with a lower coefficient of thermal transmission (for example evacuated insulation panels), with a considerable increase in production costs.

The aim of the present invention is to provide a refrigerator of the above-stated type that has low energy consumption while still being simple and economical to manufacture.

SUMMARY OF THE INVENTION

According to the invention, said aim is achieved by means of the characteristics specified in the attached claims.

The applicant has found that using metallic films or metallised polymeric films on the walls of the refrigerator (applied internally, externally or as layers incorporated into the walls) makes it possible to achieve a surprising energy saving in comparison with conventional refrigerators. Such advantages are particularly obvious when a metallic film or metallised polymeric film is used on the wall facing the condenser and are all the more remarkable when it is considered that such a saving is achieved without a substantial increase in the final cost of the product and without any excessive complication of the production process.

According to a first embodiment, the metallic film can be constituted by a laminate, for example made of aluminium, bonded to an external or internal wall of the refrigerator. Alternatively, the metallic film can be formed directly on an internal or external surface of the wall or door, for example using a well known method for depositing metallic films on polymer-type substrates.

In the second embodiment of the invention, in which a metallised polymeric film is used, the polymeric substrate (of the polyester, polyolefin etc. type) is coated on one side with a thin layer of metal (for example of silver, nickel, chromium, aluminium or indium) of a thickness of preferably between about 0.2 and about 7 microns, more preferably between about 0.5 and about 5 microns. The thickness of the polymeric substrate film is preferable between about 50 and about 120 microns, more preferably between about 70 and about 90 microns.

The metallic film or coating can be applied to the substrate film using any known deposition method, for example by means of cathodic sputtering, PVD (physical vapor deposition) or IAD (ion assisted deposition).

The function of the metallic film or metallised polymeric film is to reflect some of the thermal radiation into the environment in which the refrigerator is located and, in so doing, to reduce the transmission of heat through the material used for insulation. The film can be applied to any wall of the refrigerator, preferably keeping the metallic part exposed to the source of heat (outwards). The metallic layer of the metallised film can advantageously be provided with a protective layer that enhances its reflective properties together with its resistance to moisture and abrasion. Application can be performed using double-sided adhesive films (suitable for bonding surfaces with low surface energy) or by means of colamination.

According to another embodiment, the metallised polymeric film can also be incorporated into the actual structure of the wall or door. For example, excellent results (in terms of energy saving) have been achieved by using the metallised film between the (expanded) insulating material and the cellular coating material of the rear wall of the unit (generally know as "corrugated plastic sheet").

According to a preferred characteristic of the invention, the metallised film is bonded to the rear wall of the refrigerator with the metal layer facing the condenser. In this manner, virtually all the heat irradiated by the condenser is reflected outwards.

According to another embodiment of the invention, once the metallised polymeric film has been applied to the external face of a refrigerator wall or door, a shielding sheet, for example made of polymeric material or paperboard, is in turn applied thereto. Energy-saving results can be further improved if the shielding sheet is applied to the metallised polymeric film with interposed spacers, so as to create a gap and associated chimney effect.

BRIEF DESCRIPTION OF THE DRAWINGS

Further advantages and characteristics of a refrigerator according to the invention will emerge from the following detailed description, which is provided purely by way of non-limiting example, with reference to the attached drawings, in which.

DETAILED DESCRIPTION

Figure 1:
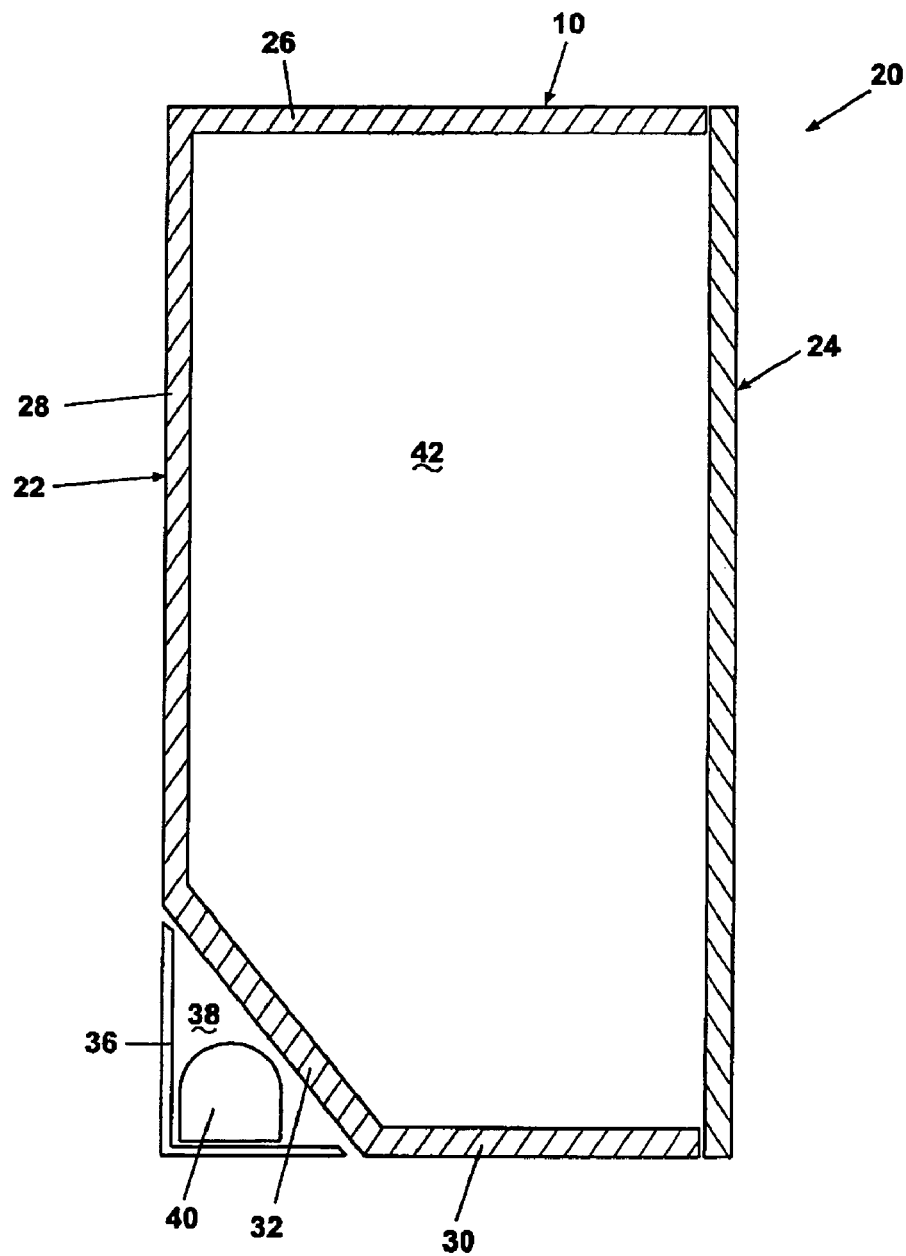
FIG. 1 is a cross-sectional view of a schematized figerated appliance according to the invention comprising an insulated wall separating a food storage compartment from a compressor.
Figure 2:
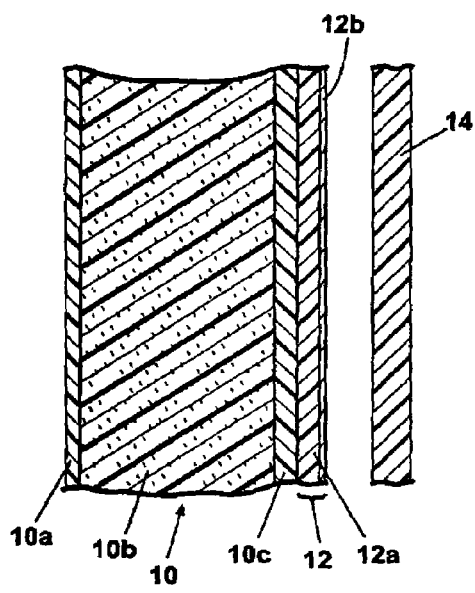
FIGS. 2–5 are schematic representations of a vertical section of the insulated wall of the refrigerator according to four embodiments of the invention.

With reference to the FIG. 1, 20 designates a refrigerated appliance comprising a cabinet 22 and an access door 24. The cabinet comprises a top wall 26, a rear wall 28, a bottom wall 30, and an inclined wall 32 extending from the bottom wall 30 to the rear wall 28 and defining a food storage compartment 42. A condenser assembly 40 is located externally of and adjacent to the inclined wall 32. A suitably shared enclosure wall 36, shown in FIG. 1 as an L-shaped shell, cooperates with the inclined wall 32 to define a condenser assembly compartment 38 in which the condenser assembly 40 is enclosed. In FIGS. 1–5, 10 designates overall one of the cabinet walls 26–32 of the food storage compartment 42, or a wall of the access door 24 constituted by an internal wall 10a obtained conventionally by thermoforming of sheets of polymer, by an insulating material 10b (for example polyurethane foam) and by an external covering 10c, likewise of polymeric material of cellular type. The covering 10c may be conventionally constituted by an extruded cellular sheet in which an air gap is defined (said sheet is conventionally known as "corrugated plastic sheet"). A metallised polymeric film 12 is bonded to the external covering 10c, said polymeric film having a layer of polymer 12a, such as a polyester or a polyolefin, in contact with the covering 10c of the wall 10 and a metallic layer 12b, which may preferably face toward a condenser assembly 40 comprising a condenser 14 of the refrigerator (FIG. 2). As one of skill in the art will recognize the layer of polymer 12a maybe a polyester or polyolefin and the metallic layer 12c may be a silver, nickel, chromium, aluminum, indium or any mixture thereof.

For the sake of clarity, the thicknesses of the film 12 shown in the drawings have deliberately been magnified. It is contemplated that the total thickness of the polymeric film should be in the range of about 50 to about 120 microns and the thickness of the metallic layer should be in the range of about 0.2 to about 7 microns, although other thickness' outside these ranges may also be applicable.

In testing carried out by the applicant, which revealed a distinct energy saving compared with identical refrigerators not provided with the metallised film bonded to the rear wall of the refrigerator, the film used was HPR 18 produced and sold by the Southwall company. The film has a polyester substrate and a total thickness of about 80 microns; the metallised layer of the film has a thickness of about 0.5 micron and is preferably, but not limited to being based on silver and indium. Other tests were performed with different types of metallised films, which yielded similar results in terms of energy savings.

Figure 3:
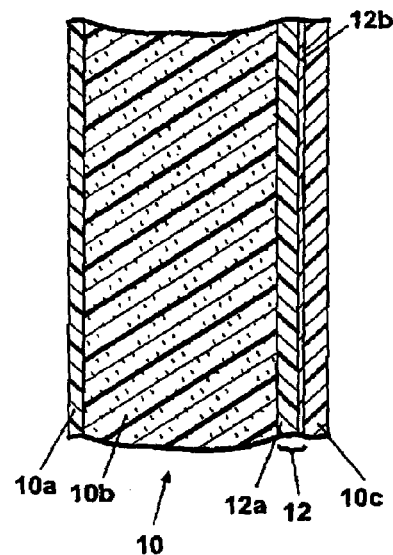

In the embodiment shown in FIG. 3, the metallised film 12 is interposed between the external covering 10c (corrugated plastic sheet) and the insulating material 10b. The film 12 can be applied during the process of forming the insulating material (foaming), in which the polyurethane insulator is injected between the internal wall 10a of the refrigerator and the external covering 10c.

Figure 4:
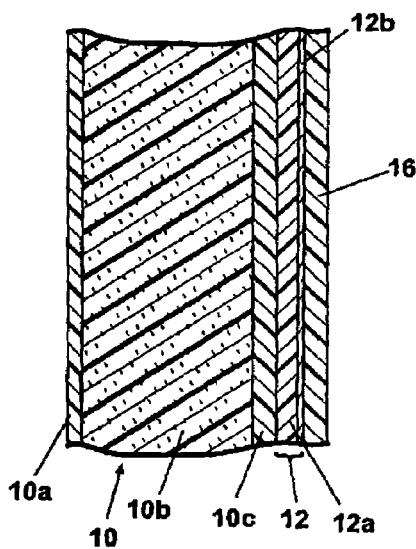
Figure 5:
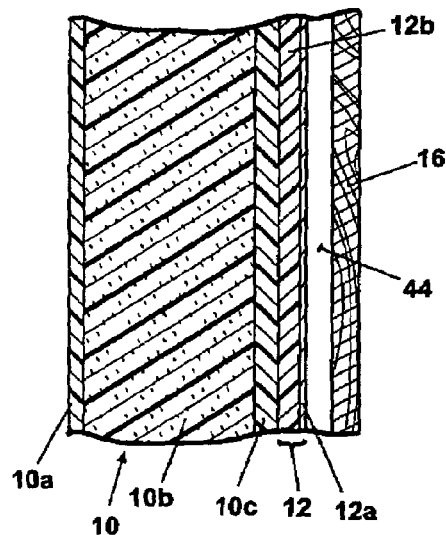

In the further embodiment shown in FIG. 4, a shielding sheet 16, for example of polymeric material or paperboard, is applied to the metallised film 12. The beneficial effect on energy saving is further increased if the shielding sheet is appropriately spaced as shown in FIG. 5 from the metallised film 12 to define a gap 44, for example by means of double-sided adhesive elements of a predetermined thickness (not shown) interposed between the shielding sheet 16 and the metallised film 12.

We claim:

1. A refrigerated appliance comprising:
   a condenser assembly;
   a plurality of insulated walls defining a food storage compartment, one of the walls separating the condenser assembly from the food storage compartment;
   at least one access door for selectively providing access to the food storage compartment;
   wherein the one of the walls located between the food storage compartment and the condenser assembly is provided with a metallic film such that the metallic film separates the food storage compartment from the condenser assembly to reflect heat from the condenser assembly away from the food storage compartment including a shielding layer interposed between the metallic film and the condenser assembly and further including a gap defined between the metallic film and the shielding layer.

2. A refrigerated appliance according to claim 1, wherein the metallic film is in contact with an external covering.

3. A refrigerated appliance according to claim 1, wherein the metallic film comprises a metallic layer supported by a polymeric film substrate.

4. A refrigerated appliance according to claim 3, wherein the polymeric film substrate comprises a polyester or a polyolefin.

5. A refrigerated appliance according to claim 4, wherein the metallic layer is selected from the group consisting of silver, nickel, chromium, aluminum, indium or mixtures thereof.

6. A refrigerated appliance according to claim 3, wherein the thickness of the polymeric film substrate is between about 50 microns and about 120 microns.

7. A refrigerated appliance according to claim 3, wherein the thickness of the metallic layer is between about 0.2 microns and about 7 microns.

* * * * *